United States Patent [19]

Walz et al.

[11] 4,122,938
[45] Oct. 31, 1978

[54] APPARATUS FOR TOPPLING CONVEYED ARTICLES

[75] Inventors: Theo Walz, Neunkirch; Fritz Glauser, Neuhausen am Rheinfall, both of Switzerland

[73] Assignee: S I G Schweizerische Industrie-Gesellschaft, Neuhausen am Rheinfall, Switzerland

[21] Appl. No.: 812,522

[22] Filed: Jul. 5, 1977

[30] Foreign Application Priority Data

Jul. 2, 1976 [CH] Switzerland ............... 8519/76

[51] Int. Cl.² ................................ B65G 47/24
[52] U.S. Cl. ........................ 198/411; 198/416
[58] Field of Search ............ 198/406, 407, 408, 410, 198/411, 412, 413, 415, 416; 193/45, 47

[56] References Cited

U.S. PATENT DOCUMENTS

| 1,876,847 | 9/1932 | Brubaker et al. | 198/411 |
|---|---|---|---|
| 2,005,629 | 6/1935 | Marsden | 198/416 |
| 2,370,325 | 2/1945 | Ranney | 198/410 |
| 2,508,368 | 5/1950 | Borkmann | 198/415 |
| 2,531,640 | 11/1950 | Oberstar | 198/416 |
| 3,306,424 | 2/1967 | Fahrenbach | 198/415 |
| 3,483,668 | 12/1969 | Frost et al. | 198/411 |
| 3,602,358 | 8/1971 | Jakobsson | 198/415 |

Primary Examiner—Evon C. Blunk
Assistant Examiner—Richard K. Thomson
Attorney, Agent, or Firm—Spencer & Kaye

[57] ABSTRACT

An apparatus for toppling conveyed articles of rectangular outline (having opposite long sides and opposite short sides) has a travel surface; a discontinuity in the travel surface; first carrier elements traveling at a distance above and along the travel surface for advancing the articles by sliding them, on one of their short sides, on the travel surface up to the discontinuity and for advancing the articles by sliding them on one of their long sides, on the travel surface downstream of the discontinuity; and at least one second carrier element which is driven in a closed path and which engages the conveyed article or article stack as the latter reaches the discontinuity in the travel surface. The speed of the second carrier element is, in the direction of article advance, greater than the speed of the first carrier elements; thus the second carrier element takes over the conveyance of the article in the zone of the discontinuity and effects, in cooperation with the discontinuity, a toppling of the article from its upright position to a lying position in which the article engages the travel surface with one of the long sides downstream of the discontinuity, where the first carrier elements take over the conveyance of the articles. The second carrier element, at least during that portion of the closed path during which it engages the article, is located at a greater distance above the travel surface than the first carrier elements.

10 Claims, 7 Drawing Figures

APPARATUS FOR TOPPLING CONVEYED ARTICLES

BACKGROUND OF THE INVENTION

This invention relates to an apparatus for toppling articles of rectangular outline, particularly cookies or crackers, in which the articles are, on a discontinuous travel surface, first brought into an upright position by carrier elements and thereafter, subsequent to a forward toppling effected by the discontinuity in the travel surface, are further conveyed in a lying position in which they are supported along one of their long sides. Apparatuses of the above-outlined type are used, for example, for introducing cookies in the correct orientation into a packing machine from a baking oven.

In a known toppling apparatus of the above-outlined type the carrier elements which convey the articles cooperate with the discontinuity in the travel surface in order to effect a forward toppling of the articles. This simple solution has several disadvantages. In particular, under certain circumstances, the articles topple rearwardly rather than forwardly; this results in an operational breakdown. Further, the proper operation of such known apparatus heavily depends on the length and width of the articles, so that changes in the article dimensions are feasible only under very narrow limits. Further, the operational speed of the apparatus, because of its own limitations, often has to be lower than what the packaging machine would readily admit.

SUMMARY OF THE INVENTION

It is an object of the invention to provide an improved apparatus of the above-outlined type from which the discussed disadvantages are eliminated.

This object and others to become apparent as the specification progresses, are accomplished by the invention, according to which, briefly stated, the apparatus for toppling conveyed articles of rectangular outline (having opposite long sides and opposite short sides) has a travel surface; a discontinuity in the travel surface; first carrier elements traveling at a distance above and along the travel surface for advancing the articles by sliding them, on one of their short sides, on the travel surface up to the discontinuity and for advancing the articles by sliding them, on one of their long sides, on the travel surface downstream of the discontinuity; and at least one second carrier element which is driven in a closed path and which engages the conveyed article or article stack as the latter reaches the discontinuity in the travel surface. The speed of the second carrier element is, in the direction of article advance, greater than the speed of the first carrier elements; thus the second carrier element takes over the conveyance of the article in the zone of the discontinuity and effects, in cooperation with the discontinuity, a toppling of the article from its upright position to a lying position in which the article engages the travel surface with one of the long sides downstream of the discontinuity, where the first carrier elements take over the conveyance of the article. The second carrier element, at least during that portion of the closed path during which it engages the article, is located at a greater distance above the travel surface than the first carrier elements.

BRIEF DESCRIPTION OF THE DRAWINGS

FIGS. 4, 5 and 6 are side elevational views, on an enlarged scale, of three different types of discontinuities in the travel surface of the apparatus according to the invention.

FIG. 7 is a plan view of a part of the embodiment of FIG. 5 on an enlarged scale.

DESCRIPTION OF THE PREFERRED EMBODIMENTS

Figure 1:
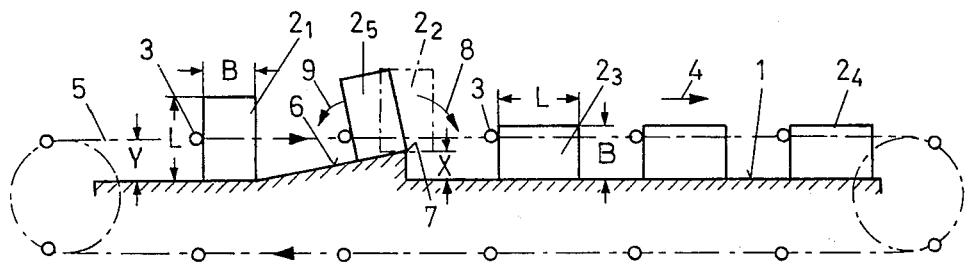
FIG. 1 is a schematic side elevational view of a toppling apparatus designed according to the prior art.

Turning now to FIG. 1, there is schematically shown a known apparatus for toppling rectangular articles, such as cookies or crackers. The apparatus has a travel surface 1 on which the articles 2 are conveyed by means of carrier rods 3 in the direction of the arrow 4. The carrier rods 3 are arranged horizontally and transversely to the travel surface surface 1 and are secured to two parallel-spaced chains 5 (only one is visible in FIG. 1). A stack of rectangular articles 2 is positioned by means of a device, not shown, on the travel surface 1 in an upright position at $2_1$ so that the length L of the articles is vertical and perpendicular to the travel surface 1 whereas their width B extends parallel thereto. The travel surface 1 has a ramp 6 which slopes upwardly in the direction of conveyance 4 and which, with its upper edge 7 constitutes a discontinuity in the travel surface 1. As an article (or article stack) is pushed up the ramp 6 into a dash-dotted position designated at $2_2$ by one of the carrier rods 3, and its center of gravity has reached a point beyond the edge 7, it tips over in the direction of the arrow 8 forwardly and assumes a lying position $2_3$ in which dimension L is parallel to the travel surface 1, whereas dimension B is perpendicular thereto. The articles are further conveyed in this position by the carrier rods 3 until, in the vicinity of the terminus of the travel surface 1, approximately at $2_4$, they are removed by means not illustrated.

The above-described known toppling apparatus has the disadvantage that in case an article stack — subsequent to an interruption in the operation — assumes a position on the ramp 6 designated at $2_5$, risks are high that in case of a rapid restart of the carrier rod 3, the stack tilts backwards in the direction of the arrow 9, because the center of gravity of the article stack is disposed above the carrier rod 3. This occurrence leads to an undesired disturbance of the operation and requires stoppage of the apparatus and a rearrangement of the articles thereon. The occurrence of the disadvantageous backward toppling of articles, in addition to the height X of the ramp 6 and the height position Y of the carrier rods 3 over the travel surface 1, is a function of the shape of the articles, that is, the magnitudes L and B as well as the initial accelaration of the conveyor chains 5. Consequently, the same apparatus is not adapted to handle articles of different dimensions. It may further happen that the first and the last article of the stack supported by lateral guides fail to tip over because of the retaining friction. Also, a high output of, for example, over 80–200 toppling operations per minute, dependent upon the shape of the articles, cannot be achieved, because certain articles, as they fall from the edge 7, do not have sufficient time to tilt forwardly to a sufficient extent and thus they again assume an upright position as they come to rest on the travel surface 1 downstream of the upper edge 7.

The above disadvantages are positively eliminated by the invention illustrated in FIGS. 2 through 6.

Figure 2:
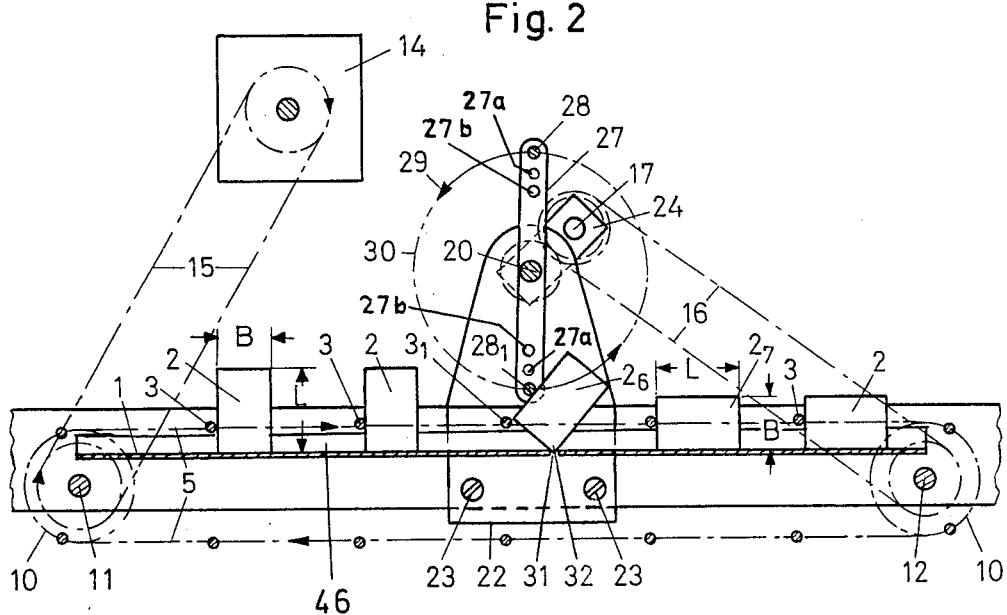
FIG. 2 is a schematic side elevational view of a preferred embodiment of the invention taken along line II—II of FIG. 3.
Figure 3:
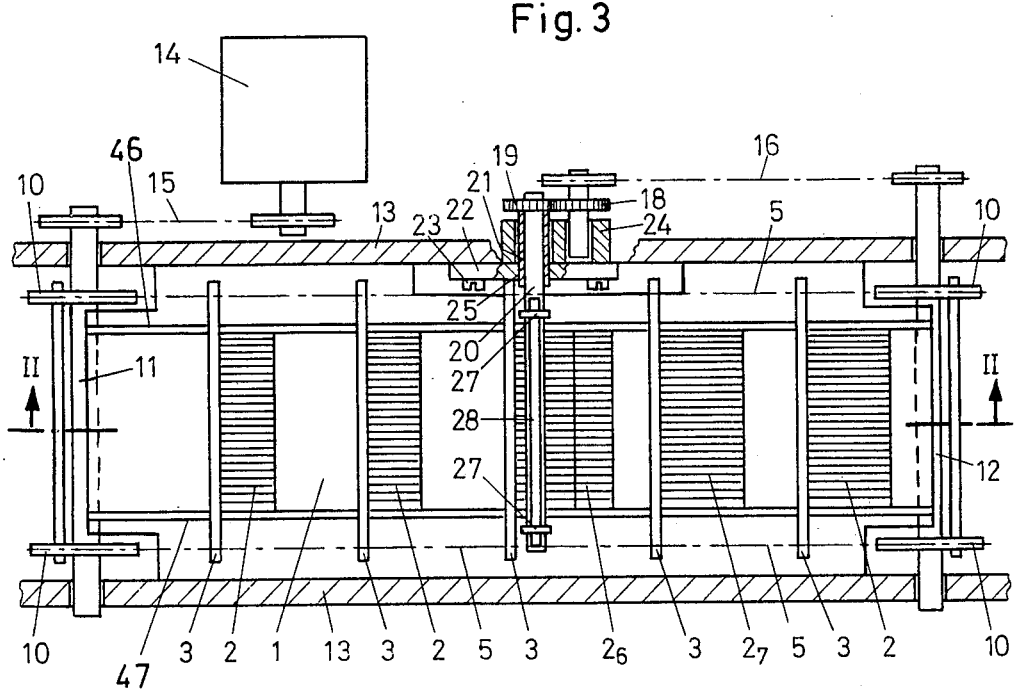
FIG. 3 is a top plan view of the same embodiment.

Turning now to FIGS. 2 and 3 there is provided, similarly to the known structure shown in FIG. 1, a travel surface 1 on which the flat rectangular articles 2 are pushed by means of carrier rods 3 secured to endless conveyor chains 5. The latter are trained about sprockets 10 mounted on shafts 11 and 12 which, in turn, are supported in a machine frame 13. The shaft 11 is driven by a motor 14 with the intermediary of an endless chain 15, while the shaft 12 drives, with the intermediary of an endless chain 16, an intermediate shaft 17 which rotates a shaft 20 by means of gears 18 and 19. The shaft 20 is supported in a bearing 21 which, in turn, is held in a bearing plate 22 secured to the machine frame 13 by means of bolts 23. The intermediate shaft 17 is supported in a pivotal bearing 24 which, at 25, pivots about the bearing 21 and is fixedly secured (not shown) with the bearing plate 22 in the different positions. To the shaft 20 there are secured two pairs of radial arms 27 which, at their ends, carry two rods 28 which are arranged transversely to the conveying direction 4 and which are offset 180° with respect to one another relative to the shaft 20. The rods 28 constitute additional carrier elements which move in a dash-dotted circular path 30 in the direction of the arrow 29. The bearing plate 22 may be attached in different positions to the machine frame 13 in such a manner that the pivotal bearing 24 is so positioned that the distance between the shafts 17 and 12 remains constant. Thus, in case of an adjustment, the length of the endless chain 16 need not be changed. The drive arrangement for the shaft 20 and the length of the arms 27 are so designed that the velocity of the rods 28 is greater than that of the rods 3 which are secured to the conveyor chains 5.

The travel surface 1 has a discontinuity constituted by a transversal gap 31 which catches the leading lower corner 32 of the article $2_6$ advanced on the travel surface 1. Upon this occurrence the rod 28 in position $28_1$ has already caught up with the rod $3_1$ and has taken over the conveyance of the article $2_6$. Since the rod 28 has, in its lowest position $28_1$, a substantially greater distance from the travel surface 1 than the rod $3_1$ and further, its tangential speed in the conveying direction is still greater than that of the carrier rod 3, the article $2_6$ is securely tilted forwardly about the discontinuity 31 (serving as the tilting axis) into the desired position which is offset at 90° with respect to the earlier position. As the article assumes its position designated at $2_7$, one of the carrier rods 3 has caught up with the toppled article 2 and subsequently, at the terminus of the travel surface 1, the articles, now lying on their long edge, are removed in a known manner. Expediently, the distance of the rods 28 from the shaft 20 is variable, for example, by providing on the arms 27 a plurality of openings 27a, 27b, through which the rods 28 may be selectively inserted. By adjusting the position of the bearing plate 22 and the bearing 24 as well as by changing the above-noted distance between the rods 28, the apparatus may be utilized for articles having widely varying rectangular dimensions without encountering the disadvantages of the known toppling devices. Further, the apparatus may operate with very high speeds without encountering the disadvantages of the prior art arrangements. Generally care is taken to ensure that the rods 28 engage the articles 2 above their center of gravity.

The adjustment of the velocities of the rods 28 is made solely by changing the diameter of the circular path 30. However, it would also be possible to remove one of the rods 28 so that the toppling movement is effected only by the remaining rod $28_1$. The shaft 20 then would make one complete revolution during the time that it takes for one carrier rod 3 of the endless chain 5 to be advanced by the length of one chain element. The correct gears ratio is chosen by changing the gear 18 and 19. The velocity at which the single rod $28_1$ engages the articles 2 may be the same as the velocity of the embodiment with two rods. This is arrived at by reducing the diameter of the circular path 30 by half.

FIGS. 4, 5 and 6 illustrate — as alternatives to the sharp-edged gap 31 shown in FIG. 2 — three variants constituting the discontinuity in the travel surface 1.

FIG. 4 shows a gap 31a, the upstream side (as viewed in the direction of conveyance) of which has a downwardly sloping configuration 33 and a rounded terminus 34. The downstream side of the gap 31a merely has a rounded terminus 35 which thus is positioned somewhat higher than the rounded terminus 34. This arrangement ensures that the leading lower edge 32 of the article is securely caught in the gap 31a, even if the article corner 32 is of rounded configuration. It is to be understood that the edges (sides) of the rectangular article need not be linear, but, as customary in case of cookies or crackers, they may be slightly arcuate or serrated. It is further noted that the toppling apparatus may be used for rod-like articles of rectangular cross section as well.

Turning now to FIG. 5, the discontinuity in the travel surface 1 includes a gap 31b, whose slightly rounded downstream terminus 36 is arranged at the free end of a pivotal ramp 37 attached to the discharge terminus of the travel surface 1. The pivotal axis 38 of the ramp 37 is transverse to the direction of article feed and is positioned in such a manner that upon adjusting the ramp into a horizontal position, the upper face of the ramp 37 is coplanar with the travel surface 1. The ramp 37 can be adjusted to slope upwardly downstream of the gap 31b. In this embodiment, the article 2 tilts about the upstream edge 39 of the gap 31b, similarly to the known device as shown in FIG. 1. There are, however, two significant differences: first, the article, prior to its toppling, is not pushed up a ramp, thus its center of gravity will not rise above the carrier rod and second, the tilting step is effected not by the carrier rod 3 but the faster moving, toppling rods 28 which are positioned higher than the rods 3. Further, if the articles remain on the ramp 37 in case the apparatus is stopped, they cannot topple backwardly as the apparatus is restarted, because they have already toppled forwardly thus they are no longer in an upright position but they lie on their longitudinal edges. The ramp 37 may also be utilized in its dash-dotted position $37_1$ in which its edge 36, in the position $36_1$, is slightly higher than the edge 39. In the horizontal position of the ramp 37 the gap 31b may be selected to be so small that the lower leading article corner is not caught therein. The possibility of such a setting is advantageous, because the effect of the discontinuity can, at will, be eliminated if, exceptionally, the apparatus is to be utilized only for regular conveyance, without the toppling operation. For such a "non-toppling" operation then the rods 28 are also rendered ineffective in some manner (for example, by moving the arms 27 into a horizontal position and disconnecting the drive of the shaft 20). It is further feasible to mount the ramp 37 in a fixed manner.

It is noted that the travel surface 1 downstream of the transversal gap may have a height below that of the travel surface 1 upstream of the gap.

Turning now to the embodiment illustrated in FIG. 6, the discontinuity in the conveyor path is constituted, instead of a gap, by a friction insert 40 which is flush with the travel surface 1 and which brakes the sliding articles to such an extent that they are incapable of assuming the speed of the carrier rods 28 and are toppled by the latter while their lower leading corner moves relatively slowly over the friction insert 40. The latter may be made of rubber or a synthetic material having similarly high coefficient of friction.

It is further feasible to provide, as the discontinuity in the travel surface 1, a sunken (i.e. lower-lying) transverse strip which is made, for example, of rubber to prevent damaging of the article as the latter, with its lower leading corner, arrives in contact therewith. It is further noted that the additional carrier elements (rods) 28 need not be guided necessarily in the circular path 30. In principle it is feasible to provide a sole additional carrier element which is driven by a linkage mechanism or which is provided on another continuously moved chain to describe an endless (closed) path having, similarly to the circular path 30, an effective path portion in which the additional carrier element, taking over conveyance of the articles in the zone of the discontinuity, effects the toppling of the articles. It is noted, however, that the described arrangement of the additional carrier elements and the drive therefor is particularly simple and expedient.

A lug 41 provided with a screw hole 42 is welded to the ramp 37 as shown in FIG. 5. Two shafts 38, of which only one is shown in FIGS. 5 and 7, are firmly attached to the ramp 37. The shafts 38 are pivotally supported in bores 44 of the machine frame 13. The ramp 37 is manually positioned at the correct angle and then it is clamped fast in this position by the screw 45 which is inserted through the guide slot 43 of the frame 13 into the screw hole 42.

From FIGS. 2 and 3 it may be seen that the travel surface 1 is provided with guides 46 and 47 on the sides.

It will be understood that the above description of the present invention is susceptible to various modifications, changes and adaptations, and the same are intended to be comprehended within the meaning and range of equivalents of the appended claims.

What is claimed is:

1. In an apparatus for toppling stacks of conveyed articles of rectangular outline having opposite long sides and opposite short sides; the apparatus having a travel surface; a discontinuity in the travel surface; a first carrier means including article-engaging first carrier rods traveling at a distance above and along the travel surface and extending generally parallel to the travel surface and transversely to the direction of travel for advancing the article stacks by sliding the articles, on one of their short sides, on the travel surface up to the discontinuity and for advancing the articles by sliding them, on one of their long sides, on the travel surface from a point downstream of the discontinuity; the improvement comprising a second carrer means having
    (a) at least one second carrier rod extending generally parallel to said first carrier rods above said travel surface;
    (b) means for moving said second carrier rod in an endless path having an effective path portion extending in a zone above said discontinuity; said second carrier rod engaging each article of successive article stacks as said second carrier rod moves in said effective path portion; said second carrier rod, at least during its motion along said effective path portion, being located at a greater distance above said travel surface than said first carrier rods; and
    (c) means for moving said second carrier rod, at least along said effective path portion, at a greater speed than the speed of said first carrier rods for effecting a takeover of article advance by said second carrier rod from the respective first carrier rod in the zone of said discontinuity for effecting, in cooperation with said discontinuity, a simultaneous toppling of the articles of the respective stacks on said travel surface to assume a lying position in which the articles engage said travel surface with one of the long sides thereof.

2. An apparatus as defined in claim 1, further comprising means for altering the position of said endless path of said second carrier rod.

3. An apparatus as defined in claim 1, further comprising means for altering the speed of said second carrier rod.

4. An apparatus as defined in claim 1, wherein said endless path of said second carrier rod is circular.

5. An apparatus as defined in claim 4, further comprising means for altering the diameter of said endless path.

6. An apparatus as defined in claim 1, further comprising means defining a gap in said travel surface, said gap extending transversely to the direction of article conveyance and constituting said discontinuity.

7. An apparatus as defined in claim 6, wherein said means defining said gap has upstream and downstream edge portions; said upstream edge portion having an upper face sloping downwardly towards said gap in the downstream direction.

8. An apparatus as defined in claim 6, wherein said means defining said gap has a downstream edge portion constituting a free end of a ramp having an upper face forming part of said travel surface downstream of said gap; said ramp being pivotally supported at its end remote from said free end; the improvement further comprising means for adjusting the inclination of said ramp.

9. An apparatus as defined in claim 6, wherein said means defining said gap has upstream and downstream edge portions; at least one of said edge portions has a rounded configuration.

10. An apparatus as defined in claim 1, further comprising a friction insert provided in said travel surface in a flush relationship therewith, said friction insert extending transversely to the direction of article conveyance and constituting said discontinuity.

* * * * *